United States Patent
Gupta et al.

(10) Patent No.: US 12,088,098 B2
(45) Date of Patent: Sep. 10, 2024

(54) POWER OUTAGE AND RESTORATION DETECTION FOR MULTI-METER NODES IN A MESH NETWORK

(71) Applicant: Landis+Gyr Innovations, Inc., Alpharetta, GA (US)

(72) Inventors: Munish Gupta, Ghaziabad (IN); Hemant Goutam, New Dehli (IN); Rushikesh Kulkarni, Cumming, GA (US); Vinicius Martins, Curitiba (BR)

(73) Assignee: Landis+Gyr Technology, Inc., Alpharetta, GA (US)

( * ) Notice: Subject to any disclaimer, the term of this patent is extended or adjusted under 35 U.S.C. 154(b) by 423 days.

(21) Appl. No.: 17/618,032

(22) PCT Filed: Jun. 10, 2019

(86) PCT No.: PCT/US2019/036291
§ 371 (c)(1),
(2) Date: Dec. 10, 2021

(87) PCT Pub. No.: WO2020/251527
PCT Pub. Date: Dec. 17, 2020

(65) Prior Publication Data
US 2022/0263315 A1    Aug. 18, 2022

(51) Int. Cl.
*H02J 3/00* (2006.01)
*H02J 13/00* (2006.01)

(52) U.S. Cl.
CPC ...... *H02J 3/0012* (2020.01); *H02J 13/00002* (2020.01)

(58) Field of Classification Search
CPC ...... H02J 3/0012; H02J 3/001; H02J 13/0002; H02J 13/0001; Y04S 10/52
See application file for complete search history.

(56) References Cited

U.S. PATENT DOCUMENTS

2010/0152910 A1    6/2010   Taft
2012/0203388 A1*   8/2012   DiLuciano ............ G06Q 10/04
                                                    700/292

(Continued)

FOREIGN PATENT DOCUMENTS

EP            3371930 B1 *  10/2021   ........... G06F 21/554

OTHER PUBLICATIONS

International Patent Application No. PCT/US2019/036291, International Search Report and Written Opinion mailed Jan. 28, 2020, 12 pages.

*Primary Examiner* — Manuel L Barbee
(74) *Attorney, Agent, or Firm* — Kilpatrick Townsend & Stockton LLP

(57) ABSTRACT

A system for detecting power status changes, such as power outages or power restorations, at a multi-meter node associated with a power distribution network is provided. For example, a multi-meter node associated with a power distribution network can be configured to detect the power status change event occurred at the node, such as a power outage event or a power restoration event. Based on the type of the event, the communication module of the multi-meter node identifies meters contained in the multi-meter node that are impacted by the event, such as meters that become unpowered due to a power outage event or meters that become powered due to a power restoration event. The communication module generates a consolidated power status change message for the impacted meters and transmits the message to a headend system over a mesh network.

20 Claims, 6 Drawing Sheets

(56) References Cited

U.S. PATENT DOCUMENTS

2014/0002169 A1 1/2014 Ramirez
2014/0085105 A1* 3/2014 Vaswani .................. G01D 4/02
   340/870.11
2017/0302511 A1* 10/2017 Foster .................... H04L 41/12

* cited by examiner

| PREVIOUS POWER STATUS | CURRENT POWER LOSS EVENT | | |
|---|---|---|---|
| | ONE PHASE DOWN (A) | TWO PHASES DOWN (A+B) | THREE PHASES DOWN (A+B+C) |
| NO POWER LOSS | SINGLE-PHASE METERS ON PHASE A <br> 308 | SINGLE-PHASE METERS ON PHASE A OR B; TWO-PHASE METERS ON A&B <br> 302 | ALL METERS |
| ONE PHASE DOWN (C) | SINGLE-METERS ON PHASE A; TWO-PHASE METERS ON A&C <br> 306 | SINGLE-PHASE METERS ON A OR B; TWO-PHASE METERS ON A&B, OR A&C, OR B&C; ALL THREE-PHASE METERS | N/A |
| TWO PHASES DOWN (B+C) | SINGLE-PHASE METERS ON A; TWO-PHASE METERS ON A&B, OR A&C; ALL THREE-PHASE METERS <br> 304 | N/A | N/A |

*FIG. 3A*

| PREVIOUS POWER STATUS | CURRENT POWER RESTORATION EVENT | | |
|---|---|---|---|
| | ONE PHASE RECOVERED (A) | TWO PHASES RECOVERED (A+B) | THREE PHASES RECOVERED (A+B+C) |
| THREE PHASES DOWN | SINGLE PHASE METERS ON A; TWO-PHASE METERS ON A&B, A&C; ALL THREE-PHASE METERS | SINGLE PHASE METERS ON A OR B; ALL TWO-PHASE METERS; All THREE-PHASE METERS | ALL METERS <br> 312 |
| TWO PHASES DOWN (A + B) | SINGLE PHASE METERS ON A; TWO-PHASE METERS ON A&B | SINGLE PHASE METERS ON A OR B; TWO-PHASE METERS ON A&B | N/A |
| ONE PHASE DOWN (A) | SINGLE PHASE METERS ON A <br> 314 | N/A | N/A |

*FIG. 3B*

POWER OUTAGE AND RESTORATION DETECTION FOR MULTI-METER NODES IN A MESH NETWORK

TECHNICAL FIELD

This disclosure relates generally to detecting and communicating power outage and restoration for meters in a multi-meter node. More particularly, this disclosure relates to detecting and generating consolidated messages for power outage and restoration for the multiple meters in a multi-meter node.

BACKGROUND

In a power distribution network, it is important for a utility company to keep track of the power outages in the power distribution work, including the locations and time the power outage occurred and the time when the power is restored. These types of information are helpful for the utility company to take actions to improve the power distribution network, such as dispatching technicians to repair issues associated with the power outage, analyzing the power outage data for system reconfiguration, etc.

To efficiently gather the power outage and restoration information, utility companies have utilized smart meters deployed at the various locations of the power distribution network. When a power outage occurs at a location, the meter deployed at the location is configured to generate a message and send the message over a mesh network to a headend system associated with the utility company. By parsing the power outage messages, the utility company can determine the specific meter that suffers the power outage and its location.

Such a method, however, is inefficient and ineffective in scenarios involving multi-meter nodes, such as cabinet meters, where multiple meters are deployed at the same location. In a cabinet meter, multiple meters are installed inside a cabinet along with a single communication module. When a power outage occurs at a cabinet meter, such as one phase of the power supply loses power, some of the meters inside the cabinet may be impacted while others are not. Existing cabinet meters, however, are incapable of identifying the impacted meters unless the entire cabinet meter has a power outage, i.e. all three phases of the power supply lose power. A possible solution is to add a communication module to each of the meters in the multi-meter node so that when a meter suffers a power outage, the respective communication module can generate and send a power outage message. In addition to adding complexity to the multi-meter node, such a solution is also inefficient in that it sends multiple power outage messages over the mesh network for a single power outage. Similar issues exist when the meters are utilized to detect and communicate power restoration.

SUMMARY

Aspects and examples are disclosed for apparatuses and process for detecting and generating consolidated messages for power outage and restoration for the multiple meters in a multi-meter node. For instance, a method for detecting and reporting a power outage and restoration in a mesh network includes obtaining a power status of a power supply at the node of the mesh network. The node includes a communication module and multiple meters connected to the power supply that has three phases. The communication module of the node determines, based on the power status of the power supply, whether a power outage has occurred at the node by determining whether at least one phase of the power supply loses power. In response to determining that a power outage has occurred, the communication module identifies two or more meters that are connected to the at least one phase and are no longer powered after the at least one phase loses power. The communication module generates one power outage message for the two or more meters indicating that the two or more meters have a power outage and transmits the one power outage message over the mesh network to a headend system.

In another example, a node of a network includes multiple meters connected to a power supply that has three phases and a communication module. The communication module includes a processor configured to execute computer-readable instructions and a memory configured to store the computer-readable instructions that, when executed by the processor, cause the processor to perform operations. The operations include obtaining a power status of a power supply at the node. The operations further include determining, based on the power status of the power supply, whether a power status change event has occurred at the node by determining whether a phase of the power supply loses or restores power. In response to determining that a power status change event has occurred, the operations further include determining two or more meters of the plurality of meters that are connected to the phase and transitioned from unpowered to powered or from powered to unpowered due to the power status change event. The operations further include generating one power status change message for the two or more meters indicating that the two or more meters have a power status change and transmitting the one power status change message over the network to a headend system.

In an additional example, a device for detecting and reporting a power outage and restoration in a mesh network is provided. The device includes a processor configured to execute computer-readable instructions and a memory configured to store the computer-readable instructions that, when executed by the processor, cause the processor to perform operations. The operations include obtaining a power status of a power supply at the device and determining, based on the power status of the power supply, whether a power status change event has occurred at the device. The determination is performed by determining whether at least one phase of the power supply loses or restores power. In response to determining that a power status change event has occurred, the operations include determining two or more meters that are connected to the at least one phase and transitioned from unpowered to powered or from powered to unpowered due to the power status change event. The two or more meters are associated with the device. The operations further include generating one power status change message for the two or more meters indicating that the two or more meters have a power status change and transmitting the one power status change message over a network to a headend system.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

FIG. 3A is a diagram illustrating examples of meters that transitioned to unpowered meters due to different power outage events, according to certain aspects of the disclosure.

FIG. 3B is a diagram illustrating examples of meters that transitioned to powered meters due to different power restoration events, according to certain aspects of the disclosure.

DETAILED DESCRIPTION

Systems and methods are provided for detecting a power outage or restoration associated with meters in a multi-meter node and communicating the power outage or restoration through a mesh network where the multi-meter node resides. For example, a multi-meter node, such as a cabinet meter, deployed at a location of a power distribution network is configured to detect a power outage (or restoration) that occurred at the location. The multi-meter node can detect the power outage (or restoration) by detecting the power outage (or restoration) associated with one or more phases of the power supplied to the node. Based on the detected phase(s) and the configuration of the multi-meter node, such as the connections between the multiple meters and the phases of the power supply, the multi-meter node determines the specific meters that transitioned from powered meters to unpowered meters due to by the power outage or transitioned from unpowered meters to powered meters due to power restoration. The multi-meter node further generates a consolidated power outage or restoration message for those impacted meters and communicates the power outage (or restoration) message to a headend system through the mesh network.

Techniques described in the present disclosure increases the efficiency and accuracy of the power outage and restoration detection and the communication of the network. By detecting the phase(s) associated with a power outage (or restoration), the multi-meter node can determine the meters connected to the phase(s) thereby identifying the individual meters impacted by the power outage (or restoration). In this way, the multi-meter node is able to generate and transmit power outage messages only for those meters impacted by the power status change event. In addition, by generating a consolidated power outage (or restoration) message, instead of generating one message for each meter, the bandwidth consumption of the mesh network through which the message is communicated is reduced. This reduction in network resource consumption is important for mesh networks where the bandwidth is limited. Further, by automatically generating the power outage (or restoration) message when the power outage (or restoration) is detected, the headend system can be notified of the power outage (or restoration) in real-time or near real-time. This allows a utility company to reduce the time to respond to the power outage in the power distribution network, and to reduce waste of resources, e.g. detecting power restoration before sending out repair teams can avoid the repair teams to be dispatched.

Figure 1:
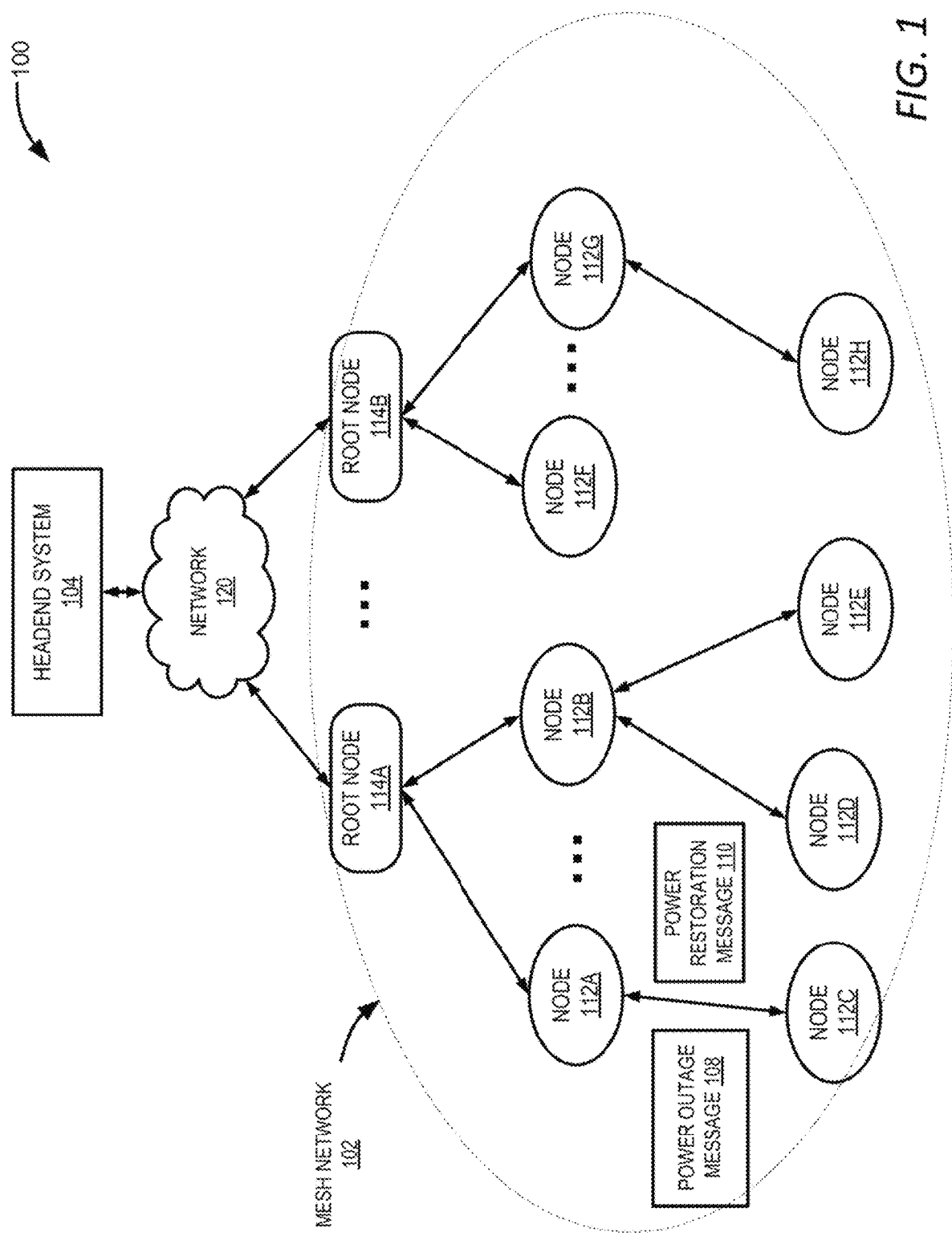
FIG. 1 is a block diagram showing an illustrative operating environment for detecting power outage and restoration at a multi-meter node of a mesh network, according to certain aspects of the disclosure.

FIG. 1 shows an illustrative network 100 in which multi-meter nodes can detect power outage or restoration occurred at the respective multi-meter nodes and generate a consolidated power status change message to a headend system. The network 100 shown in FIG. 1 includes a mesh network 102 formed by multiple nodes 112A-112H (which may be referred to herein individually as a node 112 or collectively as the nodes 112). The nodes 112 may include measuring nodes for collecting data from the respective deployed location of the nodes, processing nodes for processing data available to the nodes, router nodes for forwarding data received from one node to another node in the mesh network 100, or nodes that are configured to perform a combination of these functions.

In one example, the mesh network 102 is associated with a power distribution network to deliver measurement or other data obtained in the power distribution network. In this example, nodes 112 include electricity meters, also referred to as "meters" hereinafter, implemented to measure various operating characteristics of the power distribution network and to transmit the collected data through the mesh network 102 to root nodes 114A and 114B (which may be referred to herein individually as a root node 114 or collectively as the root nodes 114).

Root nodes 114 of the mesh network 102 may be configured for communicating with the nodes 112 to perform operations such as managing the nodes 112, collecting data from the nodes 112 and forwarding data to a headend system 104. A root node 114 can also be configured to function as a node to measure and process data itself. The root nodes 114 may be personal area network (PAN) coordinators, gateways, or any other devices capable of communicating with the headend system 104. The root nodes 114 ultimately transmit the generated and collected data to the headend system 104 via one or more additional networks 120. The headend system 104 can function as a central processing system that receives streams of data or messages from the root node 114. The headend system 104 can process the collected data or have the collected data be processed for various applications.

In one example, one or more of the nodes 112 are multi-meter nodes, such as cabinet meters. In a cabinet meter, multiple meters are installed inside a cabinet along with a single communication module. The meters can be a single-phase meter or a multi-phase meter. In some implementations, the multi-meter node 112 is configured to identify the individual meters impacted by a power outage event or a power restoration event, collectively referred to as a "power status change event." The multi-meter node 112 then generates a consolidated message for multiple impacted meters. If the power status change event involves a power outage, the multi-meter node 112 generates and sends a consolidated power outage message 108 for the multiple impacted meters. If the power status change event involves a power restoration, the multi-meter node 112 generates and sends a consolidated power restoration message 110.

The multi-meter node 112 transmits the generated message to a root node 114 which in turn forwards it to the headend system 104. The headend system 104 can utilize the received power outage messages 108 and power restoration messages 110 for various applications. For example, the headend system 104 can generate a power outage map based on the received messages, and generate alerts for power line repairs. The headend system 104 can also analyze the received messages to identify issues associated with specific locations of the power distribution network. For example, if power outage messages are received more frequently from one multi-meter node 112 than other nodes in the network, the headend system 104 may determine that there is a potential problem with the power lines or the power distribution equipment near the location of this multi-meter node 112 and that further actions need to be taken to address the potential problem. Additional details regarding detecting and communicating power status changes associated with the meters in a multi-meter node 112 are described below with regard to FIGS. 2-6.

It should be appreciated that while the description provided herein focuses on a node 112, the mechanism for detecting and communicating power status change associated with multiple meters can be utilized by any nodes in the mesh network 102, including the node 112, the root node 114, or any other nodes of the network 100 that are associated with multiple meters. In addition, while FIG. 1 depicts a specific network topology (e.g., a DODAG tree), other network topologies are also possible (e.g., a ring topology, a mesh topology, a star topology, etc.).

Figure 2:
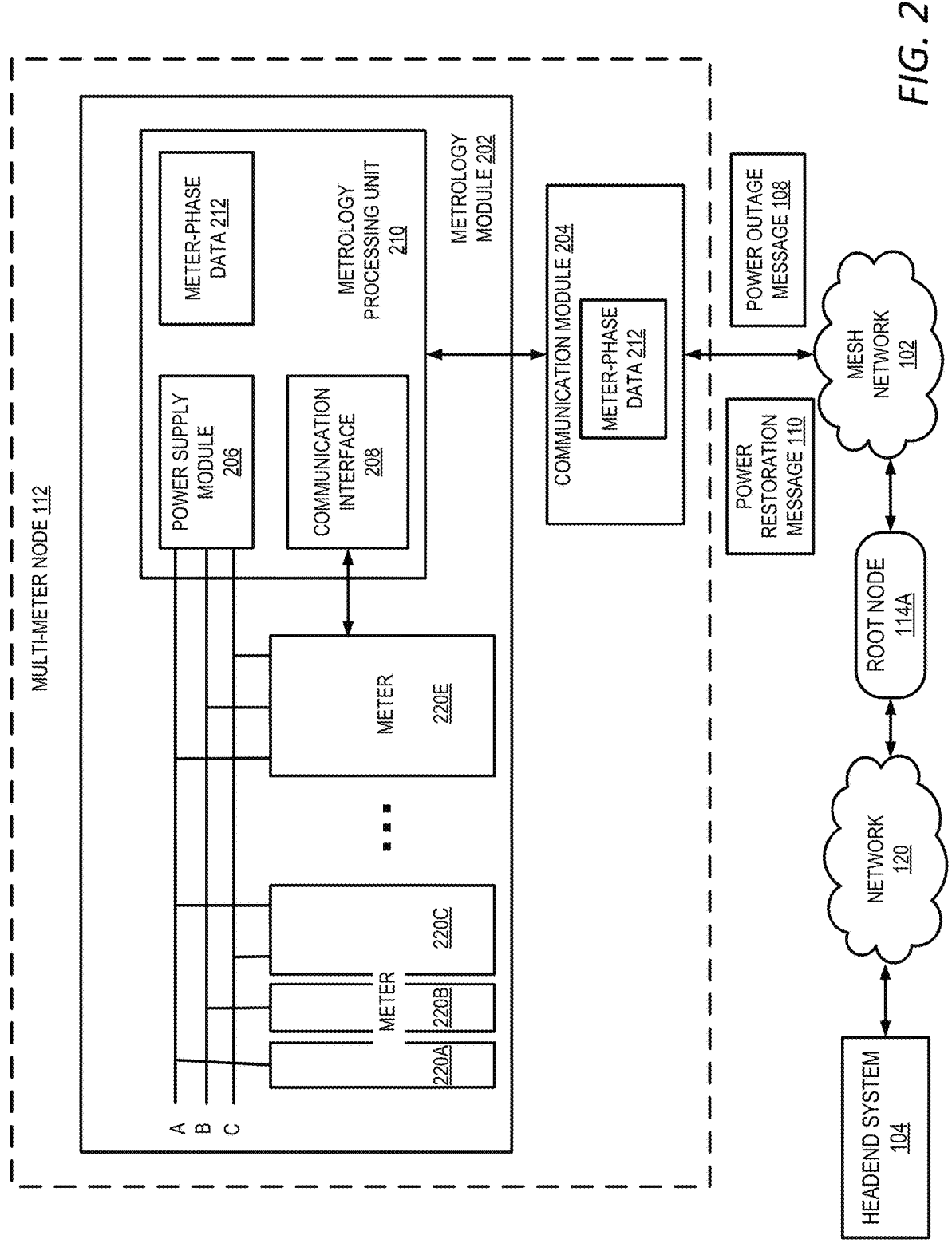
FIG. 2 is a diagram showing aspects of a multi-meter node configured for detecting and communicating power outages and restorations associated with individual meters at the multi-meter node, according to certain aspects of the disclosure.

Referring now to FIG. 2, FIG. 2 illustrates aspects of a multi-meter node 112 configured for detecting and communicating power outages and restorations associated with individual meters of the multi-meter node 112, according to certain examples of the disclosure. The multi-meter node 112 shown in FIG. 2 includes a metrology module 202 and a communication module 204. The metrology module 202 includes multiple meters 220A-220E (which may be referred to herein individually as a meter 220 or collectively as the meters 220). A meter 220 can be a single-phase meter or a multi-phase meter. A single-phase meter is connected to one of the three phases of the power supply, whereas a multi-phase meter is connected to multiple phases of the power supply. Each of the meters 220 is configured to measure operating characteristics associated with the power distribution network, such as the power consumption, peak voltage, minimum voltage, load changes or any combination thereof.

In the example shown in FIG. 2, meters 220A and 220B are single-phase meters connected to phases A and B of the power supply, respectively. Meters 220C and 220E are multi-phase meters where meter 220C is a two-phase meter connected to phases A and C of the power supply and meter 220E is a three-phase meter connected to all three phases of the power supply. In some configurations, a multi-phase meter can be implemented by connecting two or three single-phase meters. For example, the two-phase meter 220C can be implemented by connecting two signal phase meters, one connected to phase A and the other connected to phase C. Similarly, the three-phase meter 220E can be built by connecting three single-phase meters connected to phases A, B and C, respectively.

The multi-meter node 112 shown in FIG. 2 also includes a metrology processing unit 210 configured to manage and communicate with the multiple meters 220 in the multi-meter node 112. The processor 210 includes a power supply module 206 connected to and obtaining power from the power distribution network (not shown). The power supply module 206 is also configured to monitor the phase status of the power provided by the power distribution network. Through the power supply module 206, the metrology processing unit 210 is able to detect power status change in one or more phases of the power. The metrology processing unit 210 can be configured to generate a signal if a power loss is detected in one or more phases. The signal can specify the phase(s) that lost power. Similarly, if the power supply module detects that one or more phases have been restored, the metrology processing unit 210 can also generate a signal indicating the phase(s) that have power restored.

The metrology processing unit 210 further includes a communication interface 208 configured to facilitate the communication between the metrology processing unit 210 and the meters 220. In one example, the communication interface 208 provides a fiber optics communication between the metrology processing unit 210 and each meter 220. Through the communication interface 208, the metrology processing unit 210 can communicate with each of the meters 220 to determine information associated with the meters 220. For example, the metrology processing unit 210 can determine the phase(s) connected to each of the meters 220. In some implementations, the metrology module 202 includes multiple slots to hold the meters 220. For example, the metrology module 202 can include 12 slots in which each slot is connected to one of the three phases of the power supply and configured to hold a single-phase meter. A multi-phase meter can occupy two or three of the slots depending on the type of the multi-phase meter. Each of the slots is assigned a serial number and the metrology processing unit 210 can obtain the serial number through the communication interface 208. Based on the serial number of the slot(s) occupied by a meter 220, the metrology processing unit 210 can identify the slot(s) taken by the meter 220 and the phase(s) connected to the meter. The metrology processing unit 210 can also obtain the serial number of each of the meters 220 through the communication interface 208. Based on the collected information, the metrology processing unit 210 can generate meter-phase data 212 to maintain the information of the meters 220 and their associated phase information. As the meters 220 are plugged into or pulled out from the slots, the metrology processing unit 210 can update the meter-phase data 212 to reflect the changes.

The multi-meter node 112 shown in FIG. 2 further includes a communication module 204 configured to detect the power status change associated with each of the meters 220 in the metrology module 202 and to generate messages to communicate such power status change with the headend system 104. The communication module 204 communicates with the metrology processing unit 210 to obtain information such as the meter-phase data 212 to associate the meters 220 with the phases of the power supply, the power status of each phase of the power supply, the serial numbers of the meters, the meter slots of the metrology module 202, and so on.

At the time of installing the multi-meter node 112 at the premises, the communication module 204 is configured to register the metrology module 202 with the headend system 104 after being powered up. In one example, the communication module 204 obtains the meter registration information from the metrology processing unit 210. The meter registration information includes, for example, the serial numbers or other identifications of the meters 220 or the meter slots of the metrology module 202, customer information associated with each meter 220, or the combination thereof. The communication module 204 obtains the registration information and other meters related information from the metrology module 202. For example, the metrology processing unit 210 can obtain meter related information by communicating with meters 220 via the communication interface 208. The communication module 204 transmits the registration information to the headend system 104 over the mesh network 102. The headend system 104 may store the registration information for purposes such as billing or maintenance.

When the multi-meter node 112 is in operation, the communication module 204 is configured to periodically communicate with the metrology processing unit 210 to obtain information such as the measurement data generated by the meters 220. The communication module 204 also obtains the meter-phase data 212 from the metrology processing unit 210 periodically so that the communication module 204 maintains an updated copy of the meter-phase data 212 to be used in generating power status change messages.

As discussed above, if there is a power status change associated with the power supply, the metrology processing unit 210 generates a signal indicating the change and the phases associated with the change. For example, if phase A of the power supply losses power, the metrology processing unit 210 generates a signal indicating that phase A has a power loss. The communication module 204 receives such a signal from the metrology processing unit 210 and determines the meters 220 that are impacted by the power status change. In scenarios where all three phases lose power, the metrology processing unit 210 may become unpowered and thus is unable to generate the power loss signal. In those scenarios, the communication module 204 can be configured to detect the power loss through detecting a status change on a connection line between the metrology processing unit 210 and the communication module 204, such as a change from a high voltage status to a low voltage status.

Based on the determination of the power status change, the communication module 204 can generate a power status change message, either a power outage message 108 or a power restoration message 110, for the impacted meters. In scenarios where the multi-meter node 112 loses power on all three phases, the communication module 204 may be able to operate for a short period of time before shutting down, such as by using power stored in internal capacitors. During this short period of time, the communication module 204 can determine the impacted meters, generate and send the power outage message 108. Alternatively or additionally, the communication module 204 can generate and send a message to the headend system 104 indicating that all phases are down at the multi-meter node 112.

According to some aspects of the disclosure presented herein, a meter is considered as having a power outage if all the phases that the meter is connected to lose power and thus the meter transitions to an unpowered meter. In other words, as long as one of the phases that a meter is connected to still has power, the meter is considered as being powered and does not have a power outage. Accordingly, if the phase that a single-phase meter connects to loses power, the single-phase meter has a power outage. For a multi-phase meter, however, if only one of the phases that the meter is connected to loses power, the meter is not considered as having a power outage.

Similarly, if the power status change is a power restoration in one or more of its phases, some meters might have a power restoration, i.e. changing from unpowered to powered status due to the power restoration. For example, for an unpowered meter, i.e. none of the phases connected to the meter has power, a power restoration occurs when the first one of the phases regains power. As such, if a power supply lost power in all its three phases, but later regained power in phase A, the meters that have a power restoration include all the single-phase or multi-phase meters connected to phase A, even if the remaining phases of the multi-phase meters still do not have power.

FIG. 3A is a diagram illustrating a table showing examples of meters that transitioned to unpowered meters due to different power outage events, according to certain aspects of the disclosure. In the example shown in the FIG. 3A, the leftmost column shows the previous power status and the remaining columns show different current power status change events at the multi-meter node 112. The remaining entries of the table show the meters transitioned to unpowered meters due to the current power loss event when the multi-meter node 112 has a corresponding previous power status. For example, if the previous power status of the multi-meter node 112 is "no power loss" and the current power status change event is "two phases down (A+B)," table entry 302 lists the resulting unpowered meters by the current power outage event. In this example, phases A and B are the two phases that lost power. In this case, the resulting unpowered meters, i.e. meters that are considered as suffering a power outage due to the power loss of the phases A and B, include single-phase meters connected to phase A or phase B, two-phase meters connected to phases A and B. Note that two-phase meters connected to phases A and C or phases B and C, and three-phase meters are not considered as suffering a power loss because they still get power from phase C.

In another example, if the previous power status is "two phases down (B+C)" and the current event is "one phase down (A)," table entry 304 lists the meters transitioned to unpowered meters due to such an event. In this example, the phases B and C are the two phases that lost power previously, and phase A is the phase losing power in the current event. In this case, the resulting unpowered meters include single-phase meters connected to phase A, two-phase meters connected to phases A and B or phases A and C, and the three-phase meters. Note that single-phase meters connected to phase B or C are not impacted by the current event because they have already in the power loss status before the current event occurs. Similarly, two-phase meters connected to phases B and C are also not impacted by the current event of power loss on phase A. The remaining table entries list the resulting unpowered meters for other combinations of previous power status and the current event of the multi-meter node 112.

It should be noted that although the table in FIG. 3A uses certain phases as examples to illustrates the event and previous power status, these example phases can be replaced with the actual phases when the event occurs to determine the set of meters that transitioned from powered meters to unpowered meters or vice versa. For example, if the current event is a power loss on a single-phase C and the previous power status is one phase down on phase B, the meters that transitioned to unpowered meters can be determined by replacing A with C and replacing C with B in the set of meters listed in table entry 306. As a result, the resulting unpowered meters by the event in this example include single meters on phase C and two-phase meters on phases C and B.

FIG. 3B is a diagram illustrating a table showing examples of meters that transitioned to powered meters due to different power restoration events, according to certain aspects of the disclosure. Similar to the table shown in FIG. 3A, the leftmost column of the table in FIG. 3B shows the previous power status and the remaining columns show the current power status change event at the multi-meter node 112. The remaining entries of the table show the resulting powered meters when the multi-meter node 112 has a corresponding combination of previous power status and a current power restoration event. For example, if the previous power status of the multi-meter node 112 is "three phases down" (i.e. no power on all phases) and the current power status change event is "two phases recovered (A+B)," table entry 312 lists the resulting powered meters by the current event. In this example, phases A and B are the two phases that regained power. The impacted meters, i.e. meters that are considered as having the power restored due to the power recovery on phases A and B, include single-phase meters connected to phase A or phase B. The resulting powered meters also include all two-phase and three-phase meters because at least one phase of these meters having the power recovered.

The remaining table entries shown in FIG. 3B can be used to determine the resulting powered meters for other combinations of previous power status and the current power restoration event of the multi-meter node 112. Similar to FIG. 3A, the example phases used in the table shown in FIG. 3B can be replaced with the actual phases involved at the multi-meter node 112 when a power restoration event occurs to determine the set of meters transitioned to powered meters.

Referring back to FIG. 2, after determining the impacted meters, the communication module 204 can generate a consolidated power status change message for these meters. If the event is a power loss event, a consolidated power outage message 108 can be generated for the meters that transitioned to unpowered meters due to the power loss event. If the event is a power recovery event, a consolidated power restoration message 110 can be generated for the meters that transitioned to powered meters due to the power restoration event. In this way, the communication module 204 can reduce the number of messages sent out to the headend system 104 because, for example, one message, instead of three messages, is sent for a three-phase meter when the three-phase meter regains power in each of the phases. In some implementations, the power outage message 108 and the power restoration message 110 include, among other information, the serial number or other identification of the resulting powered or unpowered meters and the timestamp of the associated event. The communication module 204 transmits the power outage message 108 or the power restoration message 110 to the headend system 104 over the mesh network 102.

The headend system 104 can use the received power outage message 108 or power restoration message 110 to determine the resulting powered or unpowered meters that are caused by the power status changes. By utilizing the registration information received at the time of installation of the multi-meter node 112, the headend system 104 is able to determine the location of the power loss or restoration. Depending on the type of the message, the information contained in or derived from the received message can facilitate the headend system 104 to generate a power outage map, determine the location of the power outage, set up a repair schedule or withdraw repair crew if a power restoration is detected.

It should be understood that while FIG. 2 shows that the metrology module 202 has one metrology processing unit separate from the meters 220, other configurations are possible. For example, each of the meters can include its own metrology processing unit and these metrology processing units can collectively perform the functionality of the metrology processing unit 210 described above. Alternatively, or additionally, the communication module 204 can communicate with each of the metrology processing units to obtain the information for detecting the power status change associated with each of the meters 220 in the multi-meter node 112.

Figure 4:
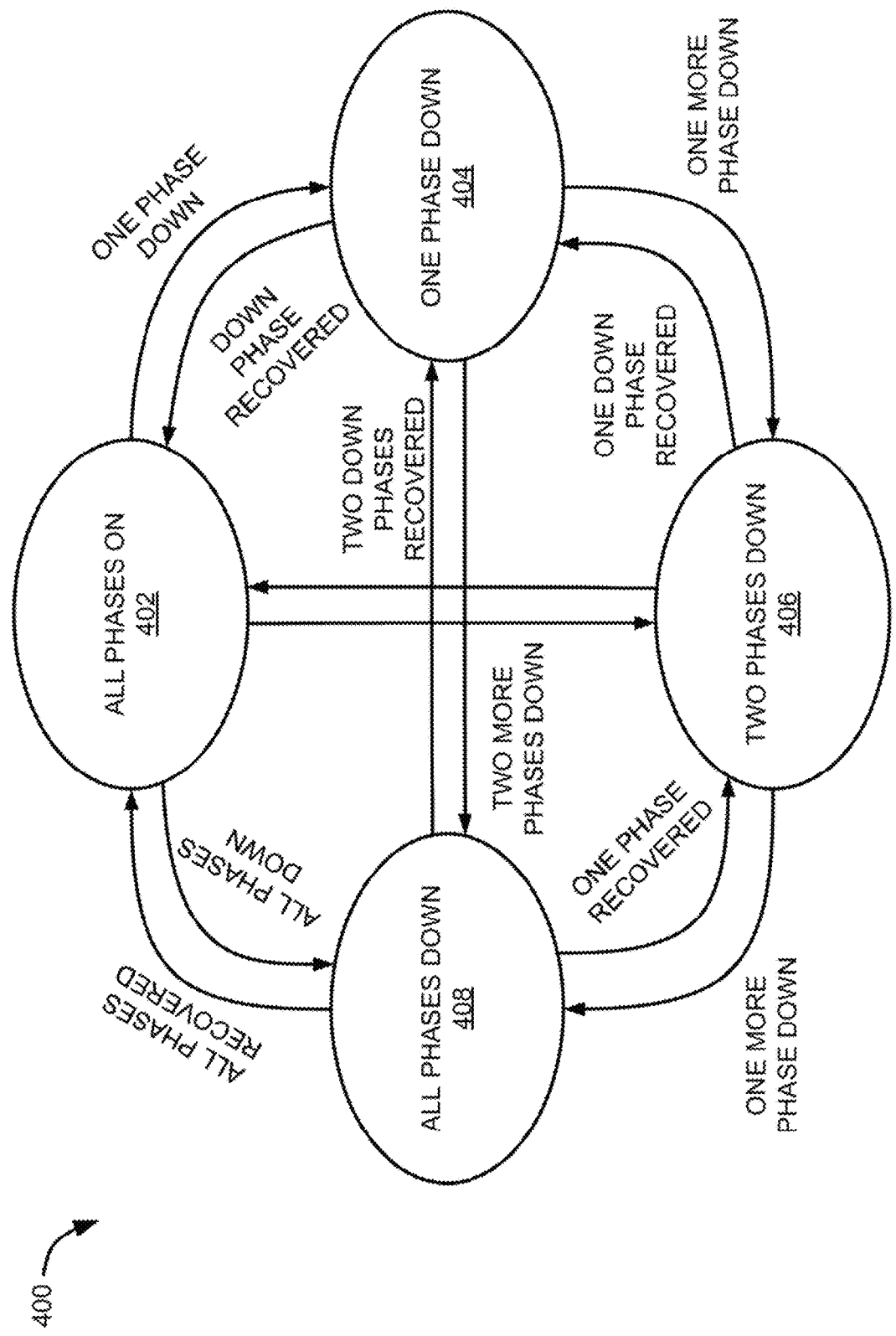
FIG. 4 is an example of a state transition diagram for a multi-meter node, according to certain aspects of the disclosure.

Referring now to FIG. 4, where an example of a state transition diagram for a multi-meter node is described. As shown in FIG. 4, a multi-meter node 112 may operate in one of four states: an "all phases on" state 402, a "one phase down" state 404, a "two phases down" state 406, and an "all phases down" state 408. If the power supply provides power on all three phases normally, the multi-meter node 112 operates in the "all phases on" state 402. If one of the three phases of the power supply loses power, the multi-meter node 112 operates in the "one phase down" state 404. Likewise, if two of the three phases of the power supply lose power, the multi-meter node 112 operates in the "two phases down" state 406. When the power supply loses power on all three phases, the multi-meter node 112 operates in the "power off" state 408.

The communication module 204 generates a power status change message (a power outage message 108 or a power restoration message 110) for resulting powered or unpowered meters when the multi-meter node 112 transitions from one state to another state. For example, if, at the "all phases on" state 402, one of the three phases of the power supply loses power, the multi-meter node 112 transitions from the "all phases on" state 402 to the "one phase down" state 404. The multi-meter node 112 generates a power outage message 108 for the meters that become unpowered due to the transition caused by the power outage of the phase. The multi-meter node 112 can determine the resulting unpowered meters by determining the meters that were powered before the transition but become unpowered after the transition. Examples of those resulting unpowered meters are listed in the table entry 308 shown in FIG. 3A. The communication module 204 generates a power outage message 108 for these resulting unpowered meters and transmits the message to the headend system 104.

From the "one phase down" state 404, if the power supply loses power on one more phase, the multi-meter node 112 transitions to the "two phases down" state 406. The communication module 204 can again determine the resulting unpowered meters by this transition as the meters that were powered before the transition but become unpowered after the transition. Examples of these resulting unpowered meters are listed in the table entry 306 shown in FIG. 3A. The communication module 204 generates another power outage message 108 for these resulting unpowered meters and transmits the message to the headend system 104.

If, at the "one phase down" state 404, the power supply recovers power on the phase that was down, the multi-meter node 112 transitions back to the "all phases on" state 402. The communication module 204 determines the meters that were unpowered by any connected phase before the transition but become powered (i.e. connected to at least one phase that has power) after the transition. Examples of these resulting powered meters are listed in the table entry 314 shown in FIG. 3B. The communication module 204 generates a power restoration message 110 for these resulting powered meters and transmits the message to the headend system 104.

The multi-meter node 112 can transition between other states depending on the previous state of the multi-meter node 112 and the current power status change event as shown in FIG. 4. In response to each transition, the communication module 204 identifies the resulting powered or unpowered meters, generates and sends a power status change message to the headend system 104 for further processing.

Figure 5:
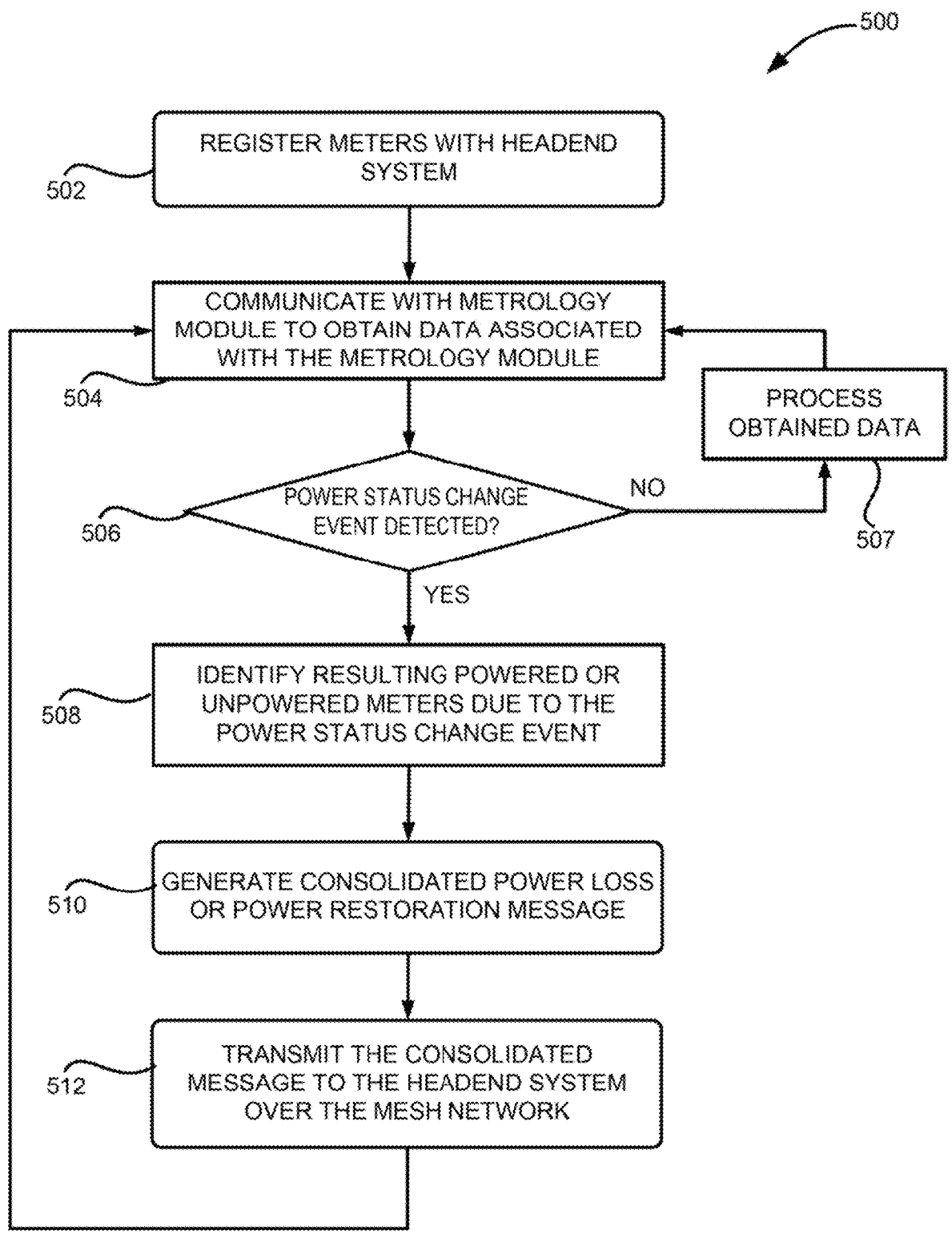
FIG. 5 is an example of a process for detecting and communicating power outage and restoration occurred at a multi-meter node, according to certain aspects of the disclosure.

FIG. 5 is an example of a process 500 for detecting and communicating power outage and restoration occurred at a multi-meter node, according to certain aspects of the disclosure. One or more nodes of the mesh network 102 (e.g., a multi-meter node 112 or a multi-meter root node 114) implement operations depicted in FIG. 5 by executing suitable program code in the communication module 204 of the multi-meter node. For illustrative purposes, the process 500 is described with reference to certain examples depicted in the figures. Other implementations, however, are possible.

At block 502, the process 500 involves registering meters in the multi-meter node with the headend system 104. The multi-meter node performs the registration by collecting information about the meters. The information can include, for example, the serial numbers or other identifications of the meters 220 or the meter slots of the metrology module 202, the address of the premises associated with each meter 220, other customer information associated with each meter 220, or any combination thereof. The communication module 204 of the multi-meter node generates a registration message including the registration information and sends it to the headend system 104.

At block 504, the process 500 involves communicating with the metrology module 202 of the multi-meter node to obtain data associated with or obtained at the metrology module 202, including meter-phase data 212, power status data indicating power status change at the power supply, measurement data, and other data. As discussed above in detail, if the metrology processing unit 210 of the metrology module 202 detects a power loss at the power supply module 206, the metrology processing unit 210 generates a signal indicating such as a power loss and the associated phase(s). Likewise, if the metrology processing unit 210 detects a power restoration at one or more phases of the power supply, the metrology processing unit 210 generates a signal indicating the power restoration and the associated phase(s). The communication module 204 can be configured to receive these signals as they are generated so that the power loss or restoration can be detected by the communication module 204 in real-time or near real-time and communicated to the headend system 104.

At block 506, the process 500 involves determining, based on the obtained data, if there is any power status change event detected at the metrology module 202. The communication module 204 can make such a determination by determining if a power loss signal or a power restoration signal is received from the metrology module 202. If not, the process 500 proceeds to block 507 to process the obtained data if necessary. For example, the communication module 204 can generate messages including measurement data at each meter and sends the messages to the headend system 104. The communication module 204 may also send or cause other communication modules to send the measurement data to other devices, including in-home displays. The process 500 then proceeds to block 504 to receive further data from the metrology module 202.

If the communication module 204 determines at block 506 that there is a power status change event, the process 500 involves, at block 508, identifying the resulting powered or unpowered meters due to the power status change event. In some implementations, and as discussed in detail above with regard to FIGS. 2, 3A and 3B, the communication module 204 determines that resulting unpowered meters by a power loss event as those meters that were powered by at least one phase of the power supply before the event, but are unpowered after the event. If the power status change event is a power restoration event, the communication module 204 determines the resulting powered meters as those meters that were unpowered before the event, but are powered by at least one phase after the power restoration event. The communication module 204 can determine the resulting powered or unpowered meters based on the meter-phase data 212 that describe the connections between the meters and the individual phases of the power supply. The communication module 204 further determines the resulting powered or unpowered meters based on the states before and after the power status change event as shown in FIG. 4.

At block 510, the process 500 involves generating a consolidated power status change message for the resulting powered or unpowered meters. If the power status change involves a power loss, the communication module 204 generates a consolidated power outage message 108. If the power status change involves a power restoration, the communication module 204 generates a consolidated power restoration message 110. In some examples, the power status change message includes the serial numbers or other identifications of the resulting powered or unpowered meters, and the timestamp of the power status change event.

At block 512, the process 500 involves transmitting the power status change message to the headend system 104 over the mesh network 102. The process 500 then proceeds to block 504, where the communication module 204 continues to obtain data from the metrology module 202.

It should be understood that while the above disclosure focuses on generating one consolidated power status change message for the resulting powered or unpowered meters, more than one message may be generated for a power status change event. For example, two power outage messages 108 may be generated for a power outage event, one for resulting powered or unpowered single-phase meters, and one for resulting powered or unpowered multi-phase meters. Other ways of generating one or more power status change messages may be utilized.

Exemplary Node

Figure 6:
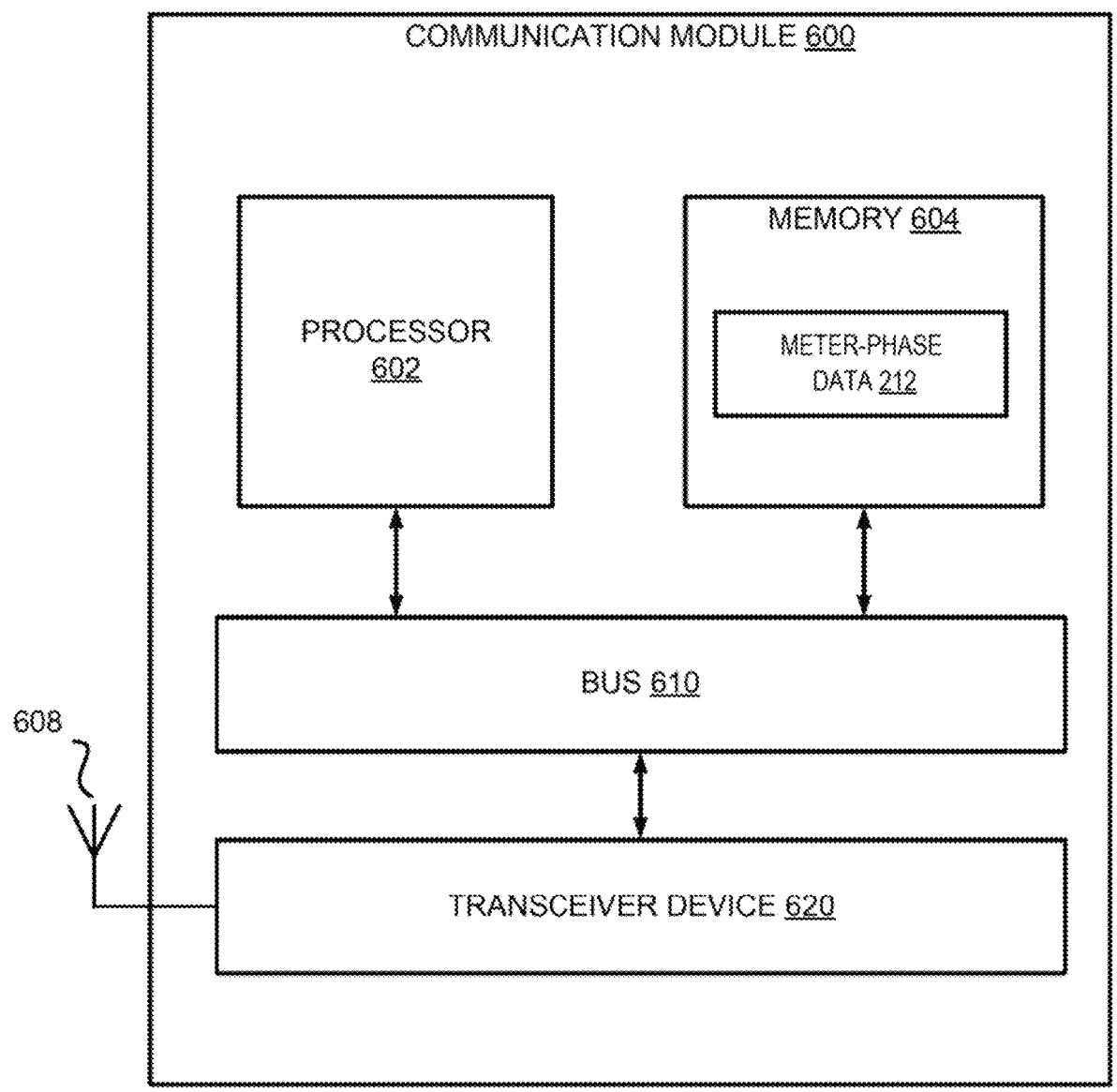
FIG. 6 is a block diagram depicting an example of a communication module suitable for implementing aspects of the techniques and technologies presented herein.

FIG. 6 illustrates an exemplary communication module 600 that can be employed to implement the power status change detection and communication described herein. The communication module 600 may include a processor 602, memory 604, and a transceiver device 620 each communicatively coupled via a bus 610. The components of the communication module 600 can be powered by an A/C power supply or a low energy source, such as a battery (not shown). The transceiver device 620 can include (or be communicatively coupled to) an antenna 608 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 604. The processor 602 can execute computer-executable program instructions or access information stored in memory to perform operations, such as the meter-phase data 212 described herein. The instructions may comprise processor-specific instructions generated by a compiler and/or an interpreter from code written in any suitable computer-programming language. When instructions, such as those provided in the communication module 204, are executed, they may configure the communication module 600 to perform any of the operations described herein. Although the processor, memory, bus, and transceiver device are depicted in FIG. 6 as separate components in communication with one another, other implementations are possible. The systems and components discussed herein are not limited to any particular hardware architecture or configuration.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for detecting and reporting a power outage and restoration in a mesh network, the method comprising:
obtaining, by a communication module of a node of the mesh network, a power status of a power supply at the node, the node comprising the communication module and a plurality of meters connected to the power supply and the power supply comprising three phases;
determining, by the communication module and based on the power status of the power supply, whether a power outage has occurred at the node by determining whether at least one phase of the power supply loses power;
in response to determining that a power outage has occurred, identifying, by the communication module, two or more meters of the plurality of meters that are connected to the at least one phase and are no longer powered after the at least one phase loses power;
generating, by the communication module, one power outage message for the two or more meters indicating that the two or more meters have a power outage; and
transmitting, by the communication module, the one power outage message over the mesh network to a headend system.

2. The method of claim 1, wherein the plurality of meters comprise a single-phase meter connected to one phase of the power supply or a multi-phase meter connected to more than one phase of the power supply.

3. The method of claim 1, wherein the node further comprises a metrology processing unit connected to the power supply and configured to communicate with the communication module, and wherein obtaining the power status of the power supply comprises receiving a signal from the metrology processing unit indicating that a phase of the power supply has lost power.

4. The method of claim 3, wherein obtaining the power status of the power supply further comprises detecting a status change of a connection between the metrology processing unit and the communication module to determine that all phases of the power supply has lost power.

5. The method of claim 4, further comprising in response to determining that all phases of the power supply have lost power, generating the one power outage message by generating a message indicating that all phases of the power supply lost power.

6. The method of claim 1, further comprising obtaining meter-phase data that identify meters associated with each phase of the power supply, wherein the two or more meters that are connected to the at least one phase and are no longer powered after the at least one phase loses power are determined based on the meter-phase data.

7. The method of claim 1, wherein the one power outage message comprises a timestamp of the power outage and identifications of the two or more meters suffering the power outage.

8. The method of claim 1, further comprising:
determining, by the communication module and based on the power status of the power supply, whether a power restoration has occurred by determining whether a phase monitored by the power supply restores power;
in response to determining that a power restoration has occurred, determining, by the communication module, two or more meters of the plurality of meters that are connected to the phase that restores power and that were not powered before the phase restores power;
generating, by the communication module, one power restoration message for the two or more meters indicating that the two or more meters have power restored; and transmitting, by the communication module, the power restoration message over the mesh network to the headend system.

9. The method of claim 1, wherein the power outage message is usable by the headend system to generate a power outage map for a power distribution network.

10. A node of a network, comprising:
a plurality of meters connected to a power supply that comprises three phases; and
a communication module comprising:
  a processor configured to execute computer-readable instructions;
  a memory configured to store the computer-readable instructions that, when executed by the processor, cause the processor to perform operations comprising:
    obtaining a power status of a power supply at the node;
    determining, based on the power status of the power supply, whether a power status change event has occurred at the node by determining whether at least one phase of the power supply loses or restores power;
    in response to determining that a power status change event has occurred, determining two or more meters of the plurality of meters that are connected to the at least one phase and transitioned from unpowered to powered or from powered to unpowered due to the power status change event;
    generating one power status change message for the two or more meters indicating that the two or more meters have a power status change; and
    transmitting the one power status change message over the network to a headend system.

11. The node of claim 10, wherein the power status change event comprises a power outage event, and wherein the one power status change message comprises a power outage message.

12. The node of claim 10, wherein the power status change event comprises a power restoration event, and wherein the one power status change message comprises a power restoration message.

13. The node of claim 10, wherein the plurality of meters comprise a single-phase meter connected to one phase of the power supply, or a multi-phase meter connected to more than one phase of the power supply.

14. The node of claim 10, wherein obtaining a power status of a power supply at the node comprises receiving a signal indicating that a phase of the power supply has lost power or a signal indicating that a phase of the power supply has restored power.

15. The node of claim 10, wherein the one power status change message comprises a timestamp of the power status change event and identifications of the two or more meters.

16. A device, comprising:
a processor configured to execute computer-readable instructions; and
a memory configured to store the computer-readable instructions that, when executed by the processor, cause the processor to perform operations comprising:
  obtaining a power status of a power supply at the device;
  determining, based on the power status of the power supply, whether a power status change event has occurred at the device by determining whether at least one phase of the power supply loses or restores power;
  in response to determining that a power status change event has occurred, determining two or more meters of a plurality of meters that are connected to the at least one phase and transitioned from unpowered to powered or from powered to unpowered due to the power status change event, the plurality of meters being associated with the device;
  generating one power status change message for the two or more meters indicating that the two or more meters have a power status change; and
  transmitting the one power status change message over a network to a headend system.

17. The device of claim 16, wherein the power status change event comprises a power outage event, and wherein the one power status change message comprises a power outage message.

18. The device of claim 16, wherein the power status change event comprises a power restoration event, and wherein the one power status change message comprises a power restoration message.

19. The device of claim 16, wherein obtaining a power status of a power supply at the device comprises receiving a signal indicating that a phase of the power supply has lost power or a signal indicating that a phase of the power supply has restored power.

20. The device of claim 16, wherein the one power status change message comprises a timestamp of the power status change event and identifications of the two or more meters.

* * * * *